United States Patent
Sem et al.

(10) Patent No.: US 6,708,507 B1
(45) Date of Patent: Mar. 23, 2004

(54) TEMPERATURE CONTROL APPARATUS AND METHOD OF DETERMINING MALFUNCTION

(75) Inventors: Thomas R. Sem, Minneapolis, MN (US); Jay Lowell Hanson, Bloomington, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 10/463,071

(22) Filed: Jun. 17, 2003

(51) Int. Cl.[7] .............................................. F25B 27/00
(52) U.S. Cl. ........................... 62/126; 62/129; 62/230; 62/323.1
(58) Field of Search ......................... 62/125, 126, 127, 62/129, 130, 230, 323.1, 323.4, 133

(56) References Cited

U.S. PATENT DOCUMENTS

| | | | |
|---|---|---|---|
| 4,023,358 A | 5/1977 | Maurer et al. | |
| 4,134,374 A | 1/1979 | Latsch et al. | |
| 4,329,957 A | 5/1982 | Havemann | |
| 4,512,295 A | 4/1985 | Hanson | |
| 4,523,572 A | 6/1985 | Staerzl | |
| 4,611,470 A | * 9/1986 | Enstrom | 62/127 |
| 4,782,800 A | 11/1988 | Hanson | |
| 4,878,465 A | 11/1989 | Hanson et al. | |
| 4,885,914 A | * 12/1989 | Pearman | 62/129 |
| 4,967,567 A | 11/1990 | Proctor et al. | |
| 5,079,930 A | 1/1992 | Beaverson et al. | |
| 5,083,545 A | 1/1992 | Yamashita et al. | |
| 5,123,253 A | 6/1992 | Hanson et al. | |
| 5,148,789 A | 9/1992 | Shiraishi et al. | |
| 5,161,384 A | 11/1992 | Hanson et al. | |
| 5,201,186 A | 4/1993 | Hanson | |
| 5,203,179 A | 4/1993 | Powell | |
| 5,222,368 A | 6/1993 | Hanson | |
| 5,249,429 A | 10/1993 | Hanson | |
| 5,284,026 A | 2/1994 | Powell | |
| 5,285,649 A | * 2/1994 | Yamanaka et al. | 62/323.1 |
| 5,331,821 A | 7/1994 | Hanson et al. | |
| 5,335,507 A | 8/1994 | Powell | |
| 5,385,029 A | * 1/1995 | Yamanaka et al. | 62/323.1 |
| 5,408,871 A | 4/1995 | Lieder et al. | |
| 5,454,229 A | 10/1995 | Hanson et al. | |
| 5,530,647 A | 6/1996 | Sem et al. | |
| 5,557,938 A | 9/1996 | Hanson et al. | |
| 5,724,941 A | 3/1998 | Suzuki et al. | |
| 5,752,387 A | * 5/1998 | Inagaki et al. | 62/323.1 |
| 5,816,220 A | 10/1998 | Stumpp et al. | |
| 5,937,824 A | 8/1999 | Ishibashi | |
| 5,950,606 A | 9/1999 | Iida et al. | |
| 5,977,646 A | 11/1999 | Lenz et al. | |
| 5,977,647 A | 11/1999 | Lenz et al. | |
| RE36,437 E | 12/1999 | Hanson et al. | |
| 6,037,864 A | 3/2000 | Sem et al. | |
| 6,196,009 B1 | 3/2001 | Nishi et al. | |
| 6,243,641 B1 | 6/2001 | Andrews et al. | |
| 6,330,802 B1 | 12/2001 | Cummings et al. | |
| 6,367,269 B1 | 4/2002 | Hanson et al. | |
| 2003/0070443 A1 | 4/2003 | Hanson et al. | |

* cited by examiner

Primary Examiner—Harry B. Tanner
(74) Attorney, Agent, or Firm—Michael Best & Friedrich LLP

(57) ABSTRACT

Apparatus and method of monitoring operation of a temperature control apparatus. The apparatus includes a controller, a refrigeration circuit extending between a compressor, a condenser, and an evaporator, and a drive unit operably connected to the compressor. The drive unit has a fuel supply, a plurality of cylinders, a fuel line extending between the fuel supply and the plurality of cylinders, and a sensor positioned between the fuel supply and the cylinders to record fuel flow. The method includes directing air across the evaporator, recording a fuel flow rate with the sensor, calculating an actual output power of the drive unit using the fuel flow rate, calculating an expected output power of the drive unit, and comparing the actual output power of the drive unit and the expected output power of the drive unit to predict malfunctions of the apparatus.

25 Claims, 5 Drawing Sheets

TEMPERATURE CONTROL APPARATUS AND METHOD OF DETERMINING MALFUNCTION

FIELD OF THE INVENTION

The present invention relates to an apparatus and method for monitoring operation of a temperature control apparatus and, more particularly, to an apparatus and method for determining temperature control apparatus failure.

BACKGROUND OF THE INVENTION

Temperature control apparatuses are commonly mounted on trucks, trailers, vans, railcars, shipping containers, and the like to control the temperature of an interior load space. In general, these temperature control apparatuses include a compressor, a condenser, an expansion valve, and an evaporator. The compressor operates to raise the pressure and temperature of a refrigerant and the condenser operates to condense the refrigerant from a high-pressure gaseous state to a liquid. The expansion valve typically controls the flow of the liquid refrigerant to the evaporator. The evaporator includes an evaporator housing and evaporator coils that extend through the evaporator housing.

During operation, relatively warm air is drawn into the evaporator housing and is directed across the evaporator coil. The refrigerant flows through the evaporator coils and absorbs heat from the air in the evaporator housing, and in this way pulls down the temperature of the air before the air is exhausted from the evaporator housing to maintain the temperature of a conditioned space at or near a set point temperature.

Drive units, such as, for example, internal combustion engines, are commonly used to power temperature control apparatuses. Typically, the drive unit provides power to one or more of the compressor, fans, and a controller.

SUMMARY OF THE INVENTION

The present invention provides a temperature control apparatus, such as a transport refrigeration unit. In one construction, the temperature control apparatus includes a refrigeration circuit extending between a compressor, a condenser, and an evaporator. A drive unit is drivingly coupled to the compressor. The drive unit has a fuel supply, a number of cylinders, a fuel line fluidly connecting the fuel supply and the cylinders, and a rack positioned along the fuel line. The rack is moveable to control a flow of fuel between the fuel supply and at least one of the cylinders. The rack has a position sensor arranged to record a rack position. A controller is in communication with the compressor and the position sensor. The controller is operable to identify malfunctions of the temperature control apparatus based on the rack position.

In some constructions, the temperature control apparatus includes a temperature sensor in thermal communication with the fuel supply to record a fuel supply temperature. The temperature sensor is in communication with the controller and the controller uses the fuel supply temperature to identify malfunctions of the temperature control apparatus.

In other constructions, the refrigeration circuit is in thermal communication with a load space having load space air and the temperature control unit includes a housing at least partially enclosing the refrigeration circuit. The housing defines an inlet and an outlet. Load space air is moveable through the inlet and the outlet. A first temperature sensor is positioned adjacent to the inlet and is operable to record a first temperature. A second temperature sensor is positioned adjacent to the outlet and is operable to record a second temperature. The controller is in signal receiving communication with the first and second temperature sensors.

The present invention also provides a method of monitoring operation of a temperature control apparatus. The method includes directing air across the evaporator, adjusting the rack, recording a rack position with the position sensor, calculating a fuel consumption rate using the rack position, calculating an actual output power of the drive unit using the fuel consumption rate, calculating an expected output power of the drive unit, and comparing the actual output power of the drive unit and the expected output power of the drive unit to predict malfunctions of the temperature control apparatus.

In some constructions, the temperature control apparatus includes a temperature sensor in thermal communication with the condenser and in communication with the controller. In some aspects of the invention, the method includes sensing a temperature of the condenser, and calculating the expected output power of the drive unit includes using the temperature of the condenser.

In other aspects, the method includes directing air across the evaporator, recording a fuel flow rate with the sensor, calculating an actual output power of the drive unit using the fuel flow rate, calculating an expected output power of the drive unit, and comparing the actual output power of the drive unit and the expected output power of the drive unit to predict malfunctions of the temperature control apparatus.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show constructions of the present invention. However, it should be noted that the invention as disclosed in the accompanying drawings is illustrated by way of example only. The various elements and combinations of elements described below and illustrated in the drawings can be arranged and organized differently to result in constructions which are still within the spirit and scope of the present invention.

In the drawings, wherein like reference numerals indicate like parts.

DETAILED DESCRIPTION

Figure 1:
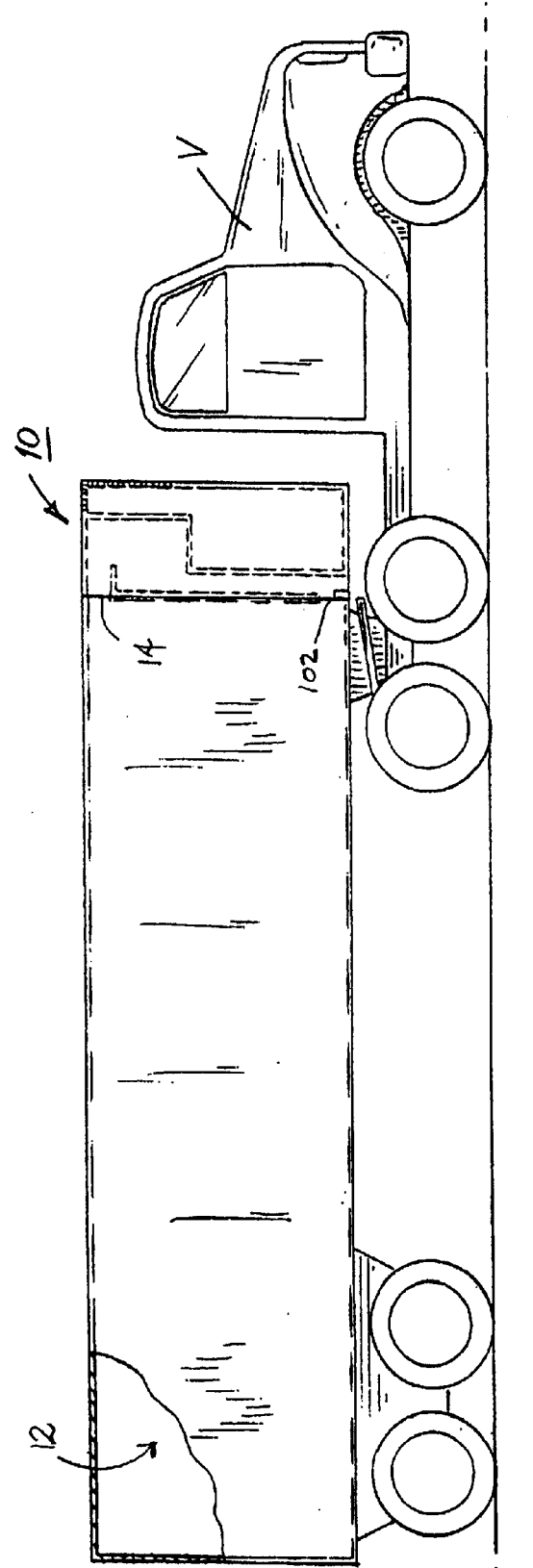
FIG. 1 is a side view, partially in section, of a vehicle having a temperature control apparatus and a drive unit embodying aspects of the present invention.

FIG. 1 illustrates a temperature control apparatus 10, such as, for example, a mobile refrigeration unit, embodying aspects of the present invention. The temperature control apparatus 10 is coupled to a vehicle V and is in thermal communication with a load space 12 of the vehicle V. In the illustrated construction, the vehicle V is a trailer coupled to a truck and the temperature control apparatus 10 is coupled to a bulkhead or wall 14. However, one having ordinary skill in the art will appreciate that the temperature control apparatus 10 could also or alternately be supported in a truck and trailer combination, a railcar, an automobile, a van, a shipping container, and the like.

Figure 2:
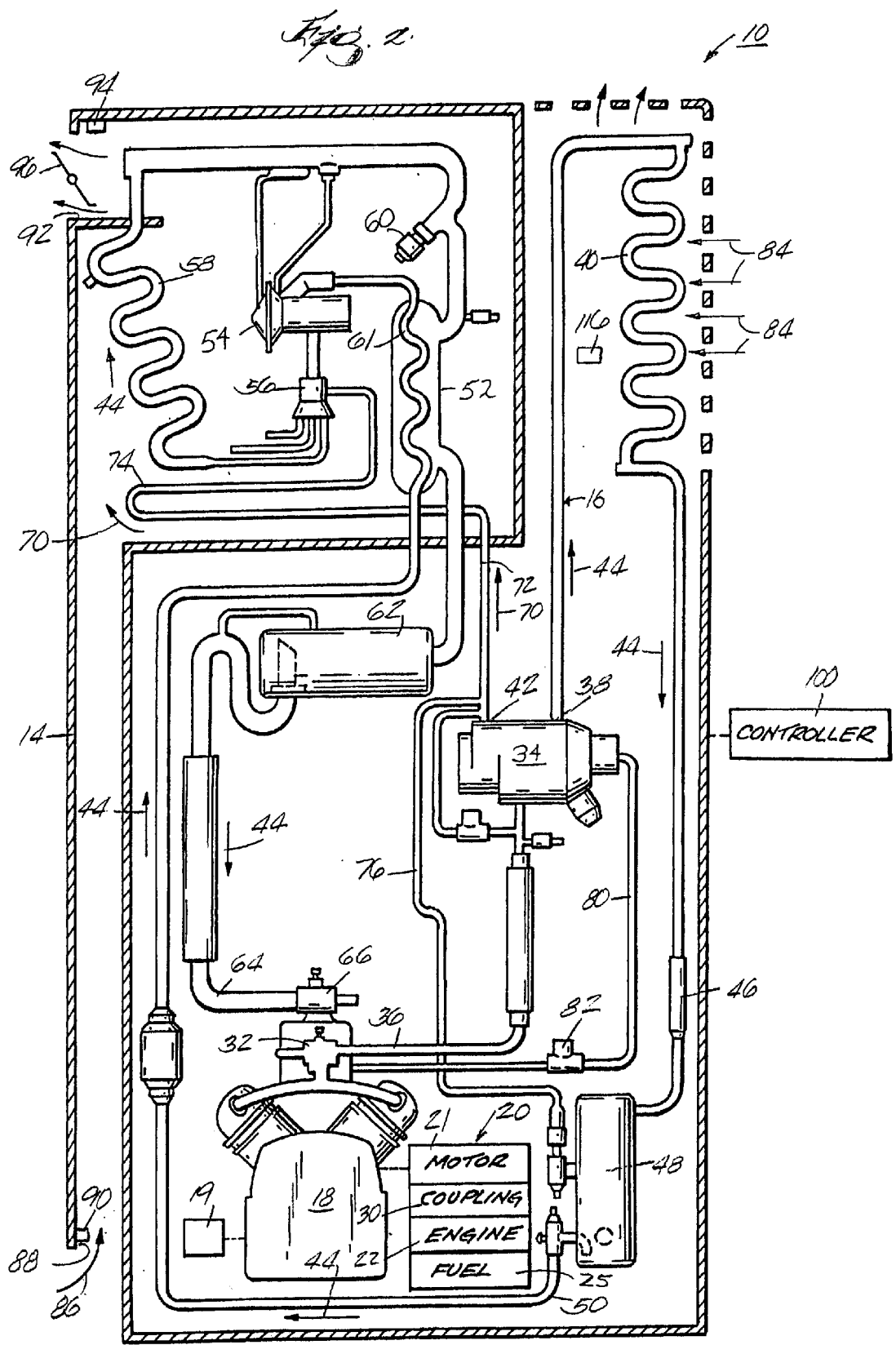
FIG. 2 is a schematic showing the temperature control apparatus shown in FIG. 1.

The temperature control apparatus 10 operates to control the temperature of the load space 12 within a predetermined temperature range (e.g., ±10° F.) surrounding a preselected set point temperature (e.g. 40° F.). As shown in FIG. 2, the temperature control apparatus 10 includes a closed refrigerant flow path 16, which includes a compressor 18 driven by a drive unit 20. The compressor 18 includes a sensor 19 for recording the rotational velocity ("$Shaft_{SPEED}$") of the compressor drive shaft 17. In alternative constructions (not shown), sensor 19 is positioned on a drive shaft of the drive unit 20 to record the output velocity of the drive unit 20.

Figure 3:
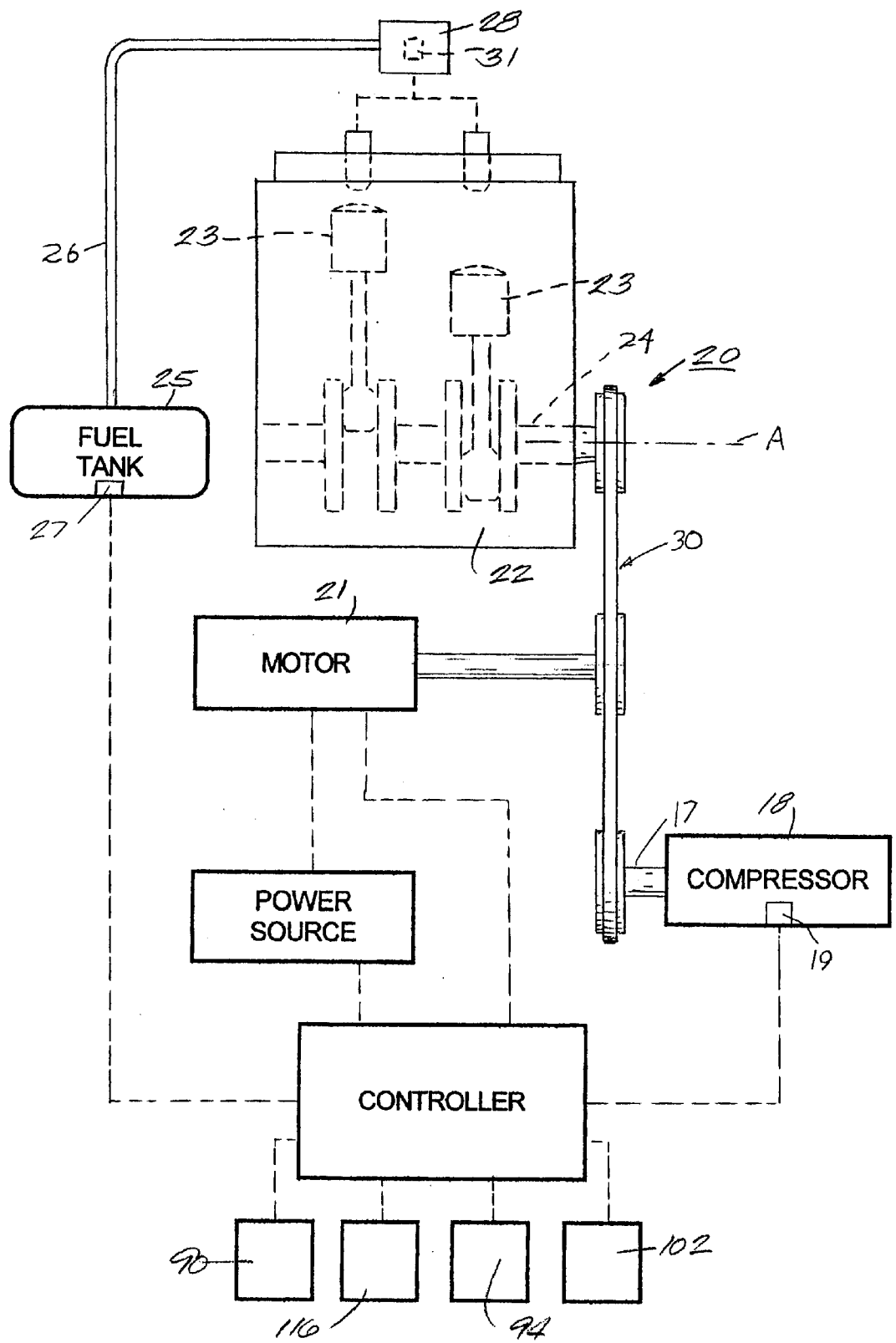
FIG. 3 is a schematic showing the drive unit shown in FIG. 1.

As shown in FIGS. 2 and 3, the drive unit 20 includes an internal-combustion engine 22 and a motor 21, which is operable to provide additional power and/or stand-by electric power to operate the temperature control apparatus 10. The engine 22 includes cylinders 23 and a drive shaft 24 coupled to the cylinders 23 for rotation about a drive shaft axis A. In the illustrated construction, the engine 22 is a two-cylinder, four-cycle diesel engine. However, one having ordinary skill in the art will appreciate that other internal-combustion engines can also or alternately be used (e.g., two-cycle engines and engines having one, three, or more cylinders). A fuel tank 25 is positioned adjacent to the engine 22 for supplying fuel to the engine 22 via a fuel line 26. A temperature sensor 27 extends into the fuel tank 25 for recording the temperature of the fuel ("$Fuel_{TEMP}$") in the fuel tank 25. A governor 28 is positioned along the fuel line 26 for controlling the flow of fuel between the fuel tank 25 and each of the cylinders 23. In the illustrated construction, the governor 28 is a mechanical centrifugal weight type governor. However, one having ordinary skill in the art will understand that in other constructions (not shown), other governors (e.g., pneumatic, electric, etc.) can also or alternately be used. The governor 28 is operable to adjust the quantity of fuel supplied to the cylinders 23 to increase the rotational speed of the drive shaft 24 and/or to increase the power generated by the output shaft 24.

Figure 4:
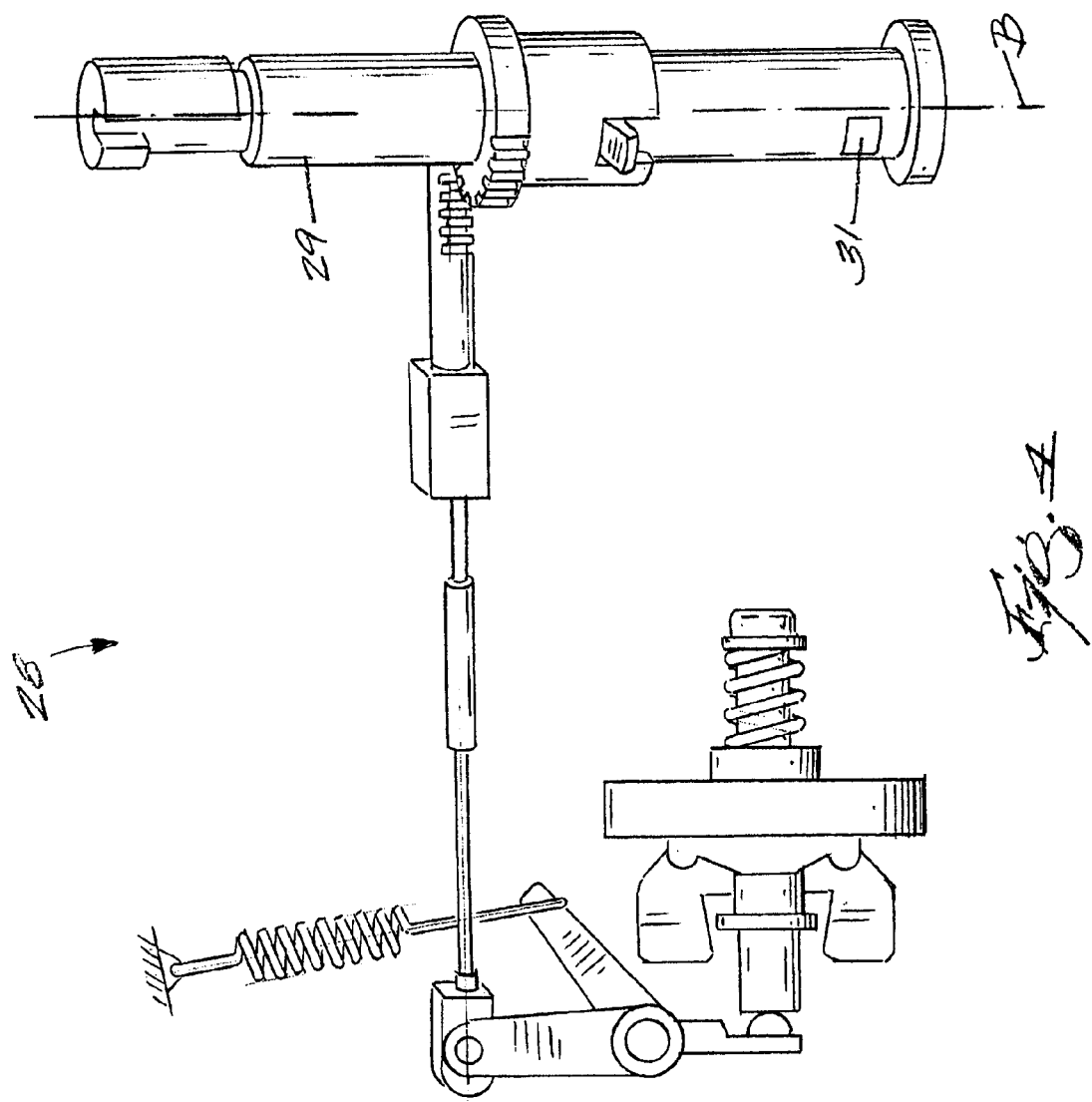
FIG. 4 is a side view of a governor for the drive unit shown in FIG. 3.

As shown in FIGS. 3 and 4, the governor 28 includes a rack 29. The rack 29 is rotatable about a central axis B in a first direction (e.g., clockwise) to increase the flow of fuel into the cylinders 23 and in a second direction (e.g., counterclockwise) to decrease the flow of fuel to the cylinders 23. The rack 29 supports a sensor 31 that records the relative position ("$Rack_{PSN}$") of the rack 29 as the rack 29 moves to admit more or less fuel into the cylinders 23.

The engine 22 and the motor 21 are coupled to the compressor 18 by a coupling 30. In the construction illustrated in FIG. 3, the coupling 30 is a belt drive. However, in other constructions (not shown), the coupling can include other known arrangements (e.g., a clutch). Depending upon the mode of operation, the engine 22 and/or the motor 21 are operated at one of a first or low operating speed and a second or high operating speed. In some constructions, the low and high speeds may be 1450 RPM or 2200 RPM, respectively. However, in other constructions (not shown), the engine 22 and/or the motor 21 can be operated at any number of other speeds.

With reference to FIG. 2, the compressor 18 includes a discharge valve 32, which is connected to an inlet port of a three-way valve 34 via discharge line 36. The three-way valve 34 is operable to switch the temperature control apparatus 10 between operation in cooling and heating cycles to maintain the load space temperature within the desired range surrounding the set point temperature. During operation in the cooling cycle, refrigerant exits the three-way valve 34 via a first outlet port 38 and travels to the inlet side of a condenser coil 40. During operation in the heating cycle, refrigerant exits the three-way valve 34 via a second outlet port 42.

With reference first to operation in the cooling cycle, refrigerant travels along a first refrigerant flow path (represented by arrows 44 in FIG. 2). The first refrigerant flow path 44 extends through the compressor 18, the three-way valve 34, the condenser coil 40, a check valve 46, a receiver tank 48, a liquid line 50, a heat exchanger 52, an expansion valve 54, a refrigerant distributor 56, an evaporator coil 58, a throttling valve 60, a line 61 extending through the heat exchanger 52, an accumulator 62, a suction line 64, a suction port 66, and back into the compressor 18.

During operation in the heating cycle, refrigerant travels along a second refrigerant flow path (represented by arrows 70 in FIG. 2). The second refrigerant flow path 70 extends out of the hot gas output of the compressor 18 and through outlet port 42, the refrigerant distributor 56 via hot gas line 72 and pan heater 74. By-pass line 76 connects the hot gas line 72 to the receiver tank 48 to force refrigerant from the receiver tank 48 into either the first or second flow paths 44, 70 during operation in the cooling and heating cycles.

A conduit 80 connects the three-way valve 34 to the low-pressure side of the compressor 18 and includes valve 82. Valve 82 is moveable between a first or closed position and a second or open position to re-direct refrigerant through the temperature control apparatus 10 during operation in the cooling and heating cycles. In the illustrated construction, valve 82 is a solenoid valve and is biased toward the first position, which corresponds to operation of the temperature control apparatus 10 in the cooling cycle. When valve 82 is in the first position, the three-way valve 34 directs refrigerant through outlet port 38 along the cooling flow path 44. To operate the temperature control apparatus 10 in the heating cycle, valve 82 is moved toward the second position and the three-way valve 34 directs refrigerant through the second outlet port 42 along the heating path 70.

In some constructions, the temperature control apparatus 10 is also operable in a defrost cycle to defrost and/or de-ice the evaporator coil 58. During operation in the defrost cycle, valve 82 is moved toward the second position and the three-way valve directs refrigerant through the second outlet port 42 along the heating path 70 to thaw and/or defrost the evaporator coil 58.

A first fan or blower (not shown) directs ambient air (represented by arrows 84 in FIG. 2) across the condenser coil 40. Exhaust heat from the condenser coil 40 is vented to the atmosphere. A second fan or blower (not shown) draws air (represented by arrow 86 in FIG. 2) from the load space 12 through an inlet 88, past return air sensor 90, and across the evaporator coil 58. As the air contacts the evaporator coil 58, the air is heated or cooled (during the heating and cooling cycles, respectively). This heated or cooled air is referred to hereafter as "discharge air". The discharge air is then directed out of the temperature control apparatus 10 into the load space 12 via outlet 92 and past exhaust air sensor 94. During operation in the defrost cycle, a damper 96 is moved to a closed position to prevent heat energy from unintentionally heating the load space 12.

As shown in FIGS. 2 and 3, the temperature control apparatus 10 also includes a controller 100, which includes a microprocessor, electrical control circuits, and an input selector. The controller 100 is operably connected to the return air sensor 90, the discharge sensor 94, and an ambient air sensor 102 (see FIGS. 1 and 3). The controller 100 is also operably connected to the drive unit 20 to control operation of the engine 22, the motor 20, and to sensors 27, 29. Additionally, in some constructions (not shown), the controller 100 is operably connected to the first and second fans (not shown), the compressor 18, the three-way valve 34, and valve 82 to control operation of the temperature control apparatus 10.

During operation of the temperature control apparatus 10, an operator enters required data (e.g., cargo type, set point temperature, an acceptable range surrounding the set point temperature, and the like) into the controller 100, or alternately, an input selector coupled to the controller 100. The controller 100 then operates the temperature control apparatus 10 in the cooling, heating, and/or defrost modes as required to maintain the desired set point temperature in the load space 12.

In some constructions, the cooling cycle includes a first or low cooling mode ("LCM") and a second or high cooling mode ("HCM"). In the low cooling mode LCM, the compressor 18 and the drive unit 20 operate at reduced speeds and in the high cooling mode HCM, the compressor 18 and the drive unit 20 operate at increased speeds. In these constructions, the controller 100 is programmed to operate the temperature control apparatus 10 in the high cooling mode HCM when the load space temperature is more than a predetermined value (e.g., 10° F.) above the desired set point temperature. As the temperature control apparatus 10 cools the load space 12 to a temperature below the predetermined value (e.g., less than 10° F. above the set point temperature), the controller 100 is programmed to switch to operation in the low cooling mode LCM for more efficient operation.

Also, in some constructions, the heating cycle includes a first or low heating mode ("LHM") and a second or high heating mode ("HHM"). In the low heating mode LHM, the compressor 18 and the drive unit 20 operate at reduced speeds and in the high heating mode HHM, the compressor 18 and the drive unit 20 operate at increased speeds. In these constructions, the controller 100 is programmed to operate the temperature control apparatus 10 in the high heating mode HHM when the load space temperature is more than a predetermined value (e.g., 10° F.) below the desired set point temperature. As the temperature control apparatus 10 heats the load space 12 to a temperature above the predetermined value (e.g., less than 10° F. below the set point temperature), the controller 100 is programmed to switch to operation in the low heating mode LHM for more efficient operation.

In a similar manner, in constructions having a defrost cycle, the defrost cycle may include a first or low defrost mode ("LDM") and a second or high defrost mode ("HDM"). When large quantities of ice and/or frost form on the evaporator coil 58 and/or when frequent defrosting is required, the temperature control apparatus 10 is operated in the high defrost mode HDM. When less frequent defrosting is required or when smaller quantities of ice and/or frost form on the evaporator coil 58, the temperature control apparatus 10 is operated in the low defrost mode LDM.

Figure 5:
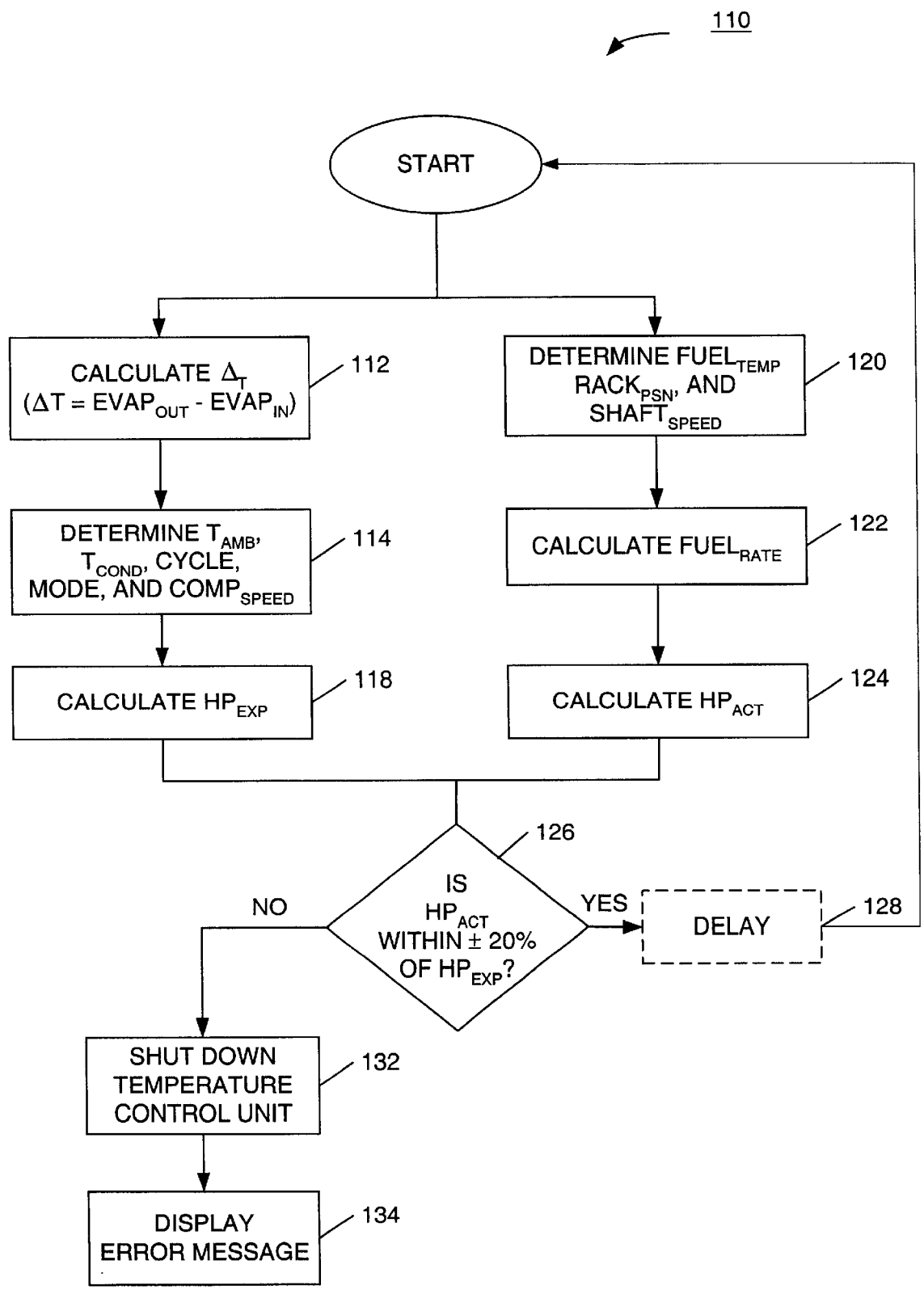
FIG. 5 is a flow chart detailing operation of a monitoring system for the temperature control apparatus and the drive unit shown in FIG. 1.

As described hereafter, the controller 100 is operable to monitor operation of the temperature control apparatus 10 and to detect system malfunctions, including, for example, refrigerant leaks, compressor failure, engine failure, and excessive fuel consumption. FIG. 5 illustrates a method 110 of detecting malfunctions in the temperature control apparatus 10.

In act 112, the controller 100 calculates the change in temperature ("ΔT") of air moving through the temperature control apparatus 10. More particularly, as shown in FIG. 2, the return air sensor 90 records the temperature of air entering the temperature control apparatus 10 from the load space 12 and the exhaust air sensor 94 records the temperature of air being exhausted from the temperature control apparatus 10 into the load space 12. The controller 100 receives data from the return and exhaust air sensors 90, 94 and calculates the change in temperature ΔT by subtracting the return air temperature from the exhaust air temperature.

In act 114, ambient sensor 102 records the temperature of the ambient air ("$T_{AMB}$"). In some constructions, the ambient sensor 102 is shielded to reduce the effects of wind caused by vehicle movement. Also, condenser sensor 116 (see FIG. 2) records the temperature ("$T_{COND}$") of air blown across the condenser coil 40 and sensor 19 records the rotational speed ("$Comp_{SPEED}$") of the compressor drive shaft 17.

In act 118, the controller 100 calculates the expected output power $HP_{EXP}$ of the engine 22 given the operating mode and cycle (e.g., HCM, LCM, HHM, LHM, HDM, and LDM), the ambient temperature $T_{AMB}$, the condenser temperature $T_{COND}$, the compressor speed $Comp_{SPEED}$, and the change in temperature ΔT. In some aspects of the invention, the controller 100 calculates the expected output power $HP_{EXP}$ of the engine 22 using one or more polynomial equations. In these aspects, empirical data taken from one or more fully functional temperature control apparatuses 10 are used to define the polynomial equation(s). The polynomial equations are calculated by plotting ambient temperature values $T_{AMB}$, corresponding condenser temperature values $T_{COND}$, compressor speeds $Comp_{SPEED}$, and the change in temperature ΔT for each of the modes of operation (e.g., HCM, LCM, HHM, LHM, HDM, and LDM). Once the polynomial equation is defined and programmed into the controller 100, the controller 100 selects the appropriate polynomial equation for a specific mode of operation and calculates the expected output power $HP_{EXP}$. One having ordinary skill in the art will appreciate that the particular polynomial equation(s) will depend to a significant degree on specific design criteria of the temperature control apparatus 10 and may vary significantly depending upon one or more of the type, size, and placement of the compressor, the condenser, the evaporator, and the first and second fans, and the quantity of refrigerant.

In another aspect of the invention, the controller 100 calculates the expected output power $HP_{EXP}$ using a number of lookup tables that are stored in the controller memory. The lookup tables are created by plotting ambient temperature values $T_{AMB}$, corresponding condenser temperature values $T_{COND}$, the change in temperature ΔT, and compressor speeds $Comp_{SPEED}$ for each of the modes of operation (e.g., HCM, LCM, HHM, LHM, HDM, and LDM).

In act 120, sensor 27 records the fuel temperature $Fuel_{TEMP}$, sensor 29 records the rack position $Rack_{PSN}$, and sensor 19 records the shaft speed $Shaft_{SPEED}$. In act 122, the controller 100 calculates the fuel consumption rate ("$Fuel_{RATE}$") of the engine 22 using fuel temperature $Fuel_{TEMP}$ data from sensor 27, rack position $Rack_{PSN}$ data from sensor 29, and shaft speed $Shaft_{SPEED}$ data from sensor 19. More particularly, in one aspect of the invention, the controller 100 calculates the fuel consumption rate ("Fuel$_{RATE}$") using a polynomial equation that correlates empirical data taken from properly working temperature control apparatuses with known fuel consumption rates. In another aspect of the invention, the controller 100 calculates the fuel consumption rate Fuel$_{RATE}$ using a lookup table stored in the controller memory. The lookup table is created by plotting fuel temperature Fuel$_{TEMP}$, rack position Rack$_{PSN}$, and Shaft$_{SPEED}$ data for a properly functioning temperature control apparatus. One having ordinary skill in the art will appreciate that the acceptable range can be changed to a significant degree without departing from the spirit and scope of the present invention.

In act 124, the controller 100 calculates the actual output power ("HP$_{ACT}$") of the engine 22 by comparing the fuel consumption rate Fuel$_{RATE}$ with empirical data for properly functioning temperature control apparatuses. In act 126, the controller 100 compares the expected output power HP$_{EXP}$ and the actual output power HP$_{ACT}$ to determine whether the actual output power HP$_{ACT}$ is within an acceptable range (e.g., ±20% of expected output power HP$_{EXP}$). The acceptable range is selected to accommodate changes in pressure of the refrigerant and the fuel that occur as the vehicle V moves the temperature control apparatus 10 to locations having different altitudes and corresponding atmospheric pressure values.

If the actual output power HP$_{ACT}$ is within the acceptable range surrounding the expected output power HP$_{EXP}$ ("YES" at act 126), the controller 100 reinitiates method 110. In some cases, the controller 100 is programmed to include a delay 128 (e.g., one minute) before re-initiating method 110. If the actual output power HP$_{ACT}$ is not within the acceptable range surrounding the expected output power HP$_{EXP}$ ("NO" at act 126), the controller 100 shuts down the temperature control apparatus 10 in act 132 and displays an error message in act 134. More particularly, if the actual output power HP$_{ACT}$ is not within the acceptable range surrounding the expected output power HP$_{EXP}$, the controller 100 shuts down the engine 22 and the motor 21, causing the compressor 18 and the first and second fans (not shown) to stop.

In general, it has been found that if the actual output power HP$_{ACT}$ is not within the acceptable range surrounding the expected output power HP$_{EXP}$, one or more relatively serious system malfunctions has occurred. In some cases, the actual output power HP$_{ACT}$ may be outside the acceptable range surrounding the expected output power HP$_{EXP}$ because refrigerant is leaking out of the temperature control apparatus 10. In other cases, the actual output power HP$_{ACT}$ may be outside the acceptable range surrounding the expected output power HP$_{EXP}$ because flow of fuel through the fuel line 26 is restricted or because the engine 22 or the compressor 18 has seized. In most of these cases, continued operation of the temperature control apparatus 10, and specifically continued operation of the drive unit 20 and/or the compressor 18, may cause serious damage to the temperature control apparatus 10. Therefore, by shutting down the temperature control apparatus 10 and alerting the operator, further damage can be prevented. Additionally, in some cases, the operator may be able to unload temperature sensitive cargo from the load space 12 before the cargo is damaged or destroyed.

The constructions described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

For example, one having ordinary skill in the art will appreciate that the present invention could also or alternately be used with stationary temperature control apparatuses. Similarly, while reference has been made herein to a mechanical temperature control apparatus having a condenser, a compressor, and an evaporator connected along a refrigerant flow path, the present invention could also or alternately be used with a cryogenic temperature control apparatus.

As such, the functions of the various elements and assemblies of the present invention can be changed to a significant degree without departing from the spirit and scope of the present invention.

What is claimed is:

1. A temperature control apparatus comprising:
    a refrigeration circuit extending between a compressor, a condenser, and an evaporator;
    a drive unit drivingly coupled to the compressor, the drive unit having a fuel supply, a plurality of cylinders, a fuel line fluidly connecting the fuel supply and the plurality of cylinders, and a rack positioned along the fuel line, the rack being moveable to control a flow of fuel between the fuel supply and at least one of the plurality of cylinders, the rack having a position sensor arranged to record a rack position; and
    a controller in communication with the compressor and the position sensor, the controller being operable to identify malfunctions of the temperature control apparatus based on the rack position.

2. The temperature control apparatus of claim 1, further comprising a temperature sensor in thermal communication with the fuel supply to record a fuel supply temperature, the temperature sensor being in communication with the controller, and wherein the controller uses the fuel supply temperature to identify malfunctions of the temperature control apparatus.

3. The temperature control apparatus of claim 1, wherein the refrigeration circuit is in thermal communication with a load space having load space air, and further comprising:
    a housing at least partially enclosing the refrigeration circuit, the housing defining an inlet and an outlet, the load space air being moveable through the inlet and the outlet;
    a first temperature sensor positioned adjacent to the inlet and operable to record a first temperature; and
    a second temperature sensor positioned adjacent to the outlet and operable to record a second temperature, the controller being in signal receiving communication with the first temperature sensor and the second temperature sensor.

4. The temperature control apparatus of claim 3, wherein the controller uses the first temperature and the second temperature to identify malfunctions of the temperature control apparatus.

5. The temperature control apparatus of claim 1, further comprising a temperature sensor positioned adjacent to the condenser to record a condenser temperature, the temperature sensor being in communication with the controller, and wherein the controller uses the condenser temperature to identify malfunctions of the temperature control apparatus.

6. The temperature control apparatus of claim 1, wherein the drive unit includes a drive shaft defining an axis, the drive shaft being rotatable about the axis, the drive shaft being operably coupled to the compressor and including a second sensor, the second sensor recording a rotational velocity of the drive shaft and being in communication with the controller, and wherein the controller uses the rotational velocity to identify malfunctions of the temperature control apparatus.

7. A method of monitoring operation of a temperature control apparatus, the temperature control apparatus including a controller, a refrigeration circuit extending between a compressor, a condenser, and an evaporator, and a drive unit drivingly connected to the compressor, the drive unit having a fuel supply, a plurality of cylinders, a fuel line extending between the fuel supply and the plurality of cylinders, and a rack positioned along the fuel line, the rack being moveable to control fuel flow between the fuel supply and the plurality of cylinders, the rack including a position sensor, the position sensor being in communication with the controller, the method comprising:

directing air across the evaporator;

adjusting the rack;

recording a rack position with the position sensor;

calculating a fuel consumption rate using the rack position;

calculating an actual output power of the drive unit using the fuel consumption rate;

calculating an expected output power of the drive unit; and comparing the actual output power of the drive unit and the expected output power of the drive unit to predict malfunctions of the temperature control apparatus.

8. The method of claim 7, wherein the temperature control apparatus is operable to condition a load space, and wherein the temperature control apparatus includes a housing, the housing having an inlet and an outlet and at least partially enclosing the evaporator, the inlet and the outlet being in thermal communication with the load space, the method further comprising:

providing a first temperature sensor positioned adjacent to the inlet, the first temperature sensor being in communication with the controller;

providing a second temperature sensor positioned adjacent to the inlet, the second temperature sensor being in communication with the controller;

sensing a first temperature at the inlet with the first temperature sensor;

sensing a second temperature at the outlet with the second temperature sensor; and calculating a temperature difference between the first temperature and the second temperature;

wherein calculating the expected output power of the drive unit includes using the temperature difference.

9. The method of claim 7, wherein the temperature control apparatus includes a temperature sensor in thermal communication with the condenser, the temperature sensor being in communication with the controller, the method further comprising sensing a temperature of the condenser, and wherein calculating the expected output power of the drive unit includes using the temperature of the condenser.

10. The method of claim 7, wherein the drive unit includes a rotatable drive shaft and a drive shaft sensor, the drive shaft sensor being in communication with the controller, the method further comprising sensing a rotational velocity of the drive shaft with the drive shaft sensor, and wherein calculating the actual output power includes using the rotational velocity of the drive shaft.

11. The method of claim 7, wherein the temperature control apparatus is operable in a refrigeration cycle and a heating cycle, and wherein calculating the expected output power of the drive unit includes using a first algorithm if the temperature control apparatus is operating in the refrigeration cycle and using a second algorithm if the temperature control apparatus is operating in the heating cycle.

12. The method of claim 7, wherein the temperature control apparatus is operable in a first refrigeration mode and a second refrigeration mode, and wherein calculating the expected output power of the drive unit includes using a first algorithm if the temperature control apparatus is operating in the first refrigeration mode and using a second algorithm if the temperature control apparatus is operating in the second refrigeration mode.

13. The method of claim 7, wherein the temperature control apparatus is operable in a first heating mode and a second heating mode, and wherein calculating the expected output power of the drive unit includes using a first algorithm if the temperature control apparatus is operating in the first heating mode and using a second algorithm if the temperature control apparatus is operating in the second heating mode.

14. The method of claim 7, wherein the temperature control apparatus is operable in a refrigeration cycle and a heating cycle, and wherein, calculating the expected output power of the drive unit includes using a first lookup table if the temperature control apparatus is operating in the refrigeration cycle and using a second lookup table if the temperature control apparatus is operating in the heating cycle.

15. The method of claim 7, wherein the temperature control apparatus is operable in a first refrigeration mode and a second refrigeration mode, and wherein calculating the expected output power of the drive unit includes using a first lookup table if the temperature control apparatus is operating in the first refrigeration mode and using a second lookup table if the temperature control apparatus is operating in the second refrigeration mode.

16. The method of claim 7, wherein the temperature control apparatus is operable in a first heating mode and a second heating mode, and wherein calculating the expected output power of the drive unit includes using a first lookup table if the temperature control apparatus is operating in the first heating mode and using a second lookup table if the temperature control apparatus is operating in the second heating mode.

17. The method of claim 7, further comprising providing an error range, and wherein comparing the actual output power of the drive unit and the expected output power of the drive unit to predict malfunctions of the temperature control apparatus includes determining if the difference between the expected power and the actual power is within the error range.

18. The method of claim 17, further comprising shutting down the refrigeration circuit if the difference between the expected power and the actual power is outside the error range.

19. The method of claim 7, wherein the temperature control apparatus is operable to condition a load space and includes a housing and an ambient temperature sensor, the ambient temperature sensor being in thermal communication with atmosphere for recording an atmospheric temperature and being in communication with the controller, and wherein calculating the expected output power of the drive unit includes using the atmospheric temperature.

20. A method of monitoring operation of a temperature control apparatus, the temperature control apparatus including a controller, a refrigeration circuit extending between a compressor, a condenser, and an evaporator, and a drive unit operably connected to the compressor, the drive unit having a fuel supply, a plurality of cylinders, a fuel line extending between the fuel supply and the plurality of cylinders, and a sensor positioned between the fuel supply and the plurality of cylinders to record fuel flow, the method comprising:

directing air across the evaporator;

recording a fuel flow rate with the sensor;

calculating an actual output power of the drive unit using the fuel flow rate;

calculating an expected output power of the drive unit; and comparing the actual output power of the drive unit and the expected output power of the drive unit to predict malfunctions of the temperature control apparatus.

21. The method of claim 20, further comprising a rack positioned along the fuel line, the rack being moveable between an open position and a closed position, and wherein the sensor is coupled to the rack to record the position of the rack.

22. The method of claim 20, wherein the temperature control apparatus is operable in a first mode and a second mode, and wherein during operation of the temperature control unit in the first mode the controller uses a first algorithm to calculate the expected output power of the drive unit and during operation of the temperature control unit in the second mode the controller uses a second algorithm to calculate the expected output power.

23. The method of claim 20, further comprising providing an error range and shutting down the temperature control unit when the difference between the actual output power of the drive unit and the expected output power of the drive is outside the error range.

24. The method of claim 20, wherein the drive unit includes a temperature sensor arranged between the fuel supply and the plurality of cylinders to record a fuel temperature, the temperature sensor being in communication with the controller, and wherein calculating the actual output power of the drive unit includes using the fuel temperature.

25. The method of claim 20, wherein the temperature control apparatus is operable in a first mode and a second mode, and wherein during operation of the temperature control unit in the first mode the controller uses a first lookup table to calculate the expected output power of the drive unit and during operation of the temperature control unit in the second mode the controller uses a second lookup table to calculate the expected output power.

* * * * *